United States Patent [19]

Okada et al.

[11] Patent Number: 4,959,520
[45] Date of Patent: Sep. 25, 1990

[54] DETECTION MEANS FOR AN ELECTRIC ARC TORCH NOZZLE

[75] Inventors: Toshihiko Okada, Takatsuki; Masanobu Uchida, Suita, both of Japan

[73] Assignee: Daihen Corporation, Osaka, Japan

[21] Appl. No.: 308,440

[22] Filed: Feb. 9, 1989

[30] Foreign Application Priority Data

Feb. 15, 1988 [JP] Japan .............................. 63-18542[U]
May 20, 1988 [JP] Japan .............................. 63-67109[U]

[51] Int. Cl.$^5$ .............................................. B23K 9/00
[52] U.S. Cl. ........................... 219/121.48; 219/121.54; 219/121.5; 219/121.57
[58] Field of Search ...................... 219/121.54, 121.57, 219/121.48, 121.5, 121.51, 121.52, 74, 75; 313/231.21, 231.31

[56] References Cited

U.S. PATENT DOCUMENTS

| | | | |
|---|---|---|---|
| 4,585,921 | 4/1986 | Wilkins et al. | 219/121.54 |
| 4,590,354 | 5/1986 | Marhic et al. | 219/121.5 |
| 4,701,590 | 10/1987 | Hatch | 219/121.52 |
| 4,767,908 | 8/1988 | Dallavalle et al. | 219/121.57 |
| 4,777,342 | 10/1988 | Hafner | 219/121.52 |
| 4,791,268 | 12/1988 | Sanders et al. | 219/121.52 |

Primary Examiner—M. H. Paschall
Attorney, Agent, or Firm—Scully, Scott, Murphy & Presser

[57] ABSTRACT

An electric arc torch having a pair of detection units for detecting a mounted and dismounted state of a nozzle detachably mounted on an end of the torch provides a pair of holders for holding the pair of detection units each of which is formed separate from the torch body of the torch, a pair of grooves for containing the pair of holders therein each of which is formed on the torch body of the torch and a cover member for fixing the pair of holders to the torch body from the outside thereof which is detachably fixed to the torch body.

3 Claims, 6 Drawing Sheets

DETECTION MEANS FOR AN ELECTRIC ARC TORCH NOZZLE

BACKGROUND OF THE INVENTION

1. Field of the Invention

The present invention relates to an electric arc torch in which a power feeding member and a nozzle for covering the same are coaxially disposed at a tip portion of the torch body thereof and two detection means for detecting a mounted and dismounted state of the nozzle are provided each of which provides a detection pin slidable in parallel with the axis of the power feeding member.

2. Description of Prior Art

A plasma arc torch as shown in FIG. 16(A) or a consumable electrode type arc torch as shown in FIG. 16(B) is widely used as an electric arc torch for cutting or welding works. It invites a very dangerous state if the power is supplied to the power feeding member 2 in the state that the nozzle 3 has been dismounted to repair the arc torch. In order to avoid this, a detection means 4' is provided for detecting that the nozzle 3 is dismounted from the torch body of the arc torch 1 and, when it is detected thereby, the power supply is suspended for the safety of repair work.

FIGS. 16(A) and 16(B) show tip portions of conventional arc torches 1 having such a detection means 4', respectively and FIG. 16(C) shows the detection means 4' in an enlarged scale. The detection means 4, is comprised of a terminal element 6 to which an end of a conductor 5 is connected, a detection pin 7 slidable in the axial direction of the arc torch, a compression spring 8 inserted between the terminal element 6 and the detection pin 7 and an O-ring 9 acting as a stopper for the detection pin 7. One more detection means 4' (not shown) is arranged integrally with the torch body and diametrically opposed to the former one to form a pair of detection means 4' and 4'.

The mounted and dismounted state of the nozzle 3 can be detected by a contacted and discontacted state between the detection pin 7 and the nozzle 3. Namely, the detection pin 7 is moved in the upward direction $Y_2$ against the spring force by the compression spring 8 when the nozzle 3 is mounted to the torch. On the upper end surface of the nozzle 3, an electrically conductive thin film (not shown) is formed and, therefore, two detection pins 7 of the pair of the detection means 4' and 4' are electrically conducted with each other by the conductive thin film as long as the nozzle 3 remains mounted.

On the contrary, when the nozzle 3 is dismounted from the torch body, two detection means 4' and 4' are electrically disconnected with each other and, thereby, a detection signal is generated. Due to this detection signal, the power supply to the power feeding element 2 is suspended. As stated above, the spring force applied to each detection pin 7 by the compression spring 8 is supported by the O-ring 9 functioning as a stopper for the pin in this state. In this context, it is impossible to omit the O-ring 9.

However, O-ring 9 is easily worn out due to the shearing force by the compression spring 8 and the heat exerted thereto during use of the torch.

Further, the conventional arc torch has disadvantages that the detection pin 7 cannot slide in the axial direction smoothly when itself or the guide means therefor is deformed accidentally by a strong external force and that the conductor 5 is cut off when a strong external force is applied to the torch.

Due to these reasons, it becomes necessary to frequently repair the detection means 4' and/or to change the O-ring 9 and, in the case that it becomes impossible to interchange the old one to a new one, the torch body supporting the detection means 4' and 4' integrally has to be replaced with a new one.

SUMMARY OF THE INVENTION

An object of the present invention is to provide an electric arc torch having a detection means for detecting a dismounted state of a nozzle which is interchangeable independently of the torch body of the torch.

Another object of the present invention is to provide an electric arc torch having a detection means for detecting a dismounted state of a nozzle which does not need any O-ring.

One more object of the present invention is to provide an electric arc torch having a detection means for detecting a dismounted state of a nozzle which is protected so as to be free from an external force.

In order to achieve these objects, according to the present invention, there is provided an, electric arc torch having a handle portion and an end portion whose axes cross at a predetermined angle wherein a power feeding member and a nozzle covering the power feeding member are arranged coaxially on said end portion of the torch and a pair of detection means for detecting a mounted and dismounted state of said nozzle are arranged on said end portion parallel to the axis thereof. The detection means are provided with a pair of holders for holding their respective detection means. The holders are formed separately from said end portion of the torch, and grooves are provided for containing said two holders therein formed on the periphery of said end portion parallel to the axis thereof. A cover member for covering at least upper end portions of said holders is provided for fixing said pair of holders and is detachably fixed to said end portion of the torch.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENT

Figure 1:
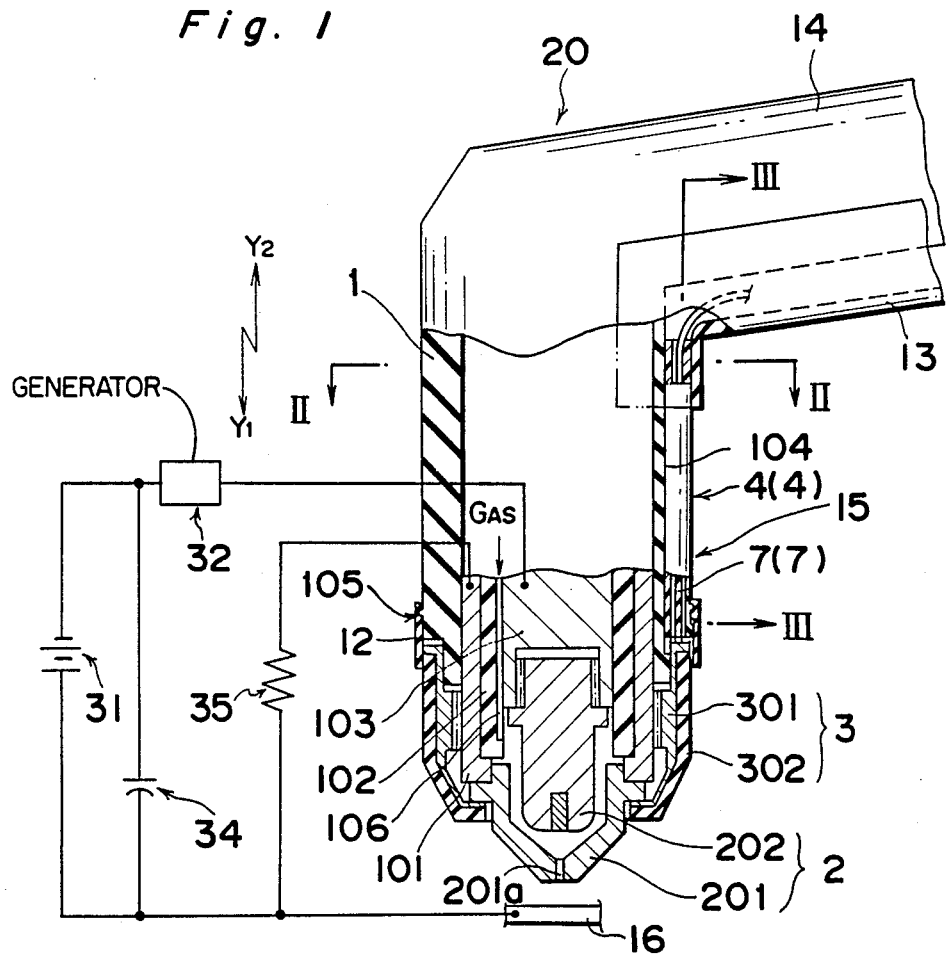
FIG. 1 is a partially sectioned front view of an electric arc torch according to the preferred embodiment of the present invention.

FIG. 1 shows a head portion of a plasma electric arc torch 20.

The electric arc torch 20 has a cylindrical torch body 1 of an electric insulation material and a power feeding means 2 for generating a plasma arc which is supported interchangeably at the lower end of the torch body 1.

The power feeding means 2 is comprised of a first power feeding member 101 having a cylindrical configuration which is inserted into the cylindrical torch body 1, a second power feeding member 103 inserted into a cylindrical insulation member 102 which is inserted into the first power feeding member 101 in order to insulate the first and second power feeding members 101 and 103 from each other, a tip member 201 electrically connected to the first power feeding member 101 and an electrode 202 electrically connected to the second power feeding member 103.

It is desirable to arrange a small tip of an anti-melting material such as hafnium or zirconium at the tip end of the electrode 202 of a copper metal alloy in order to delay the consumption of the latter.

Four gas passages 106 are formed between the insulation cylinder 102 and the second power feeding member 103 in order to introduce a plasma forming gas such as argon, oxygen, air or a mixture of these gases. The gas flowing through each of gas passages is introduced into an annular space between the electrode 202 and the tip 201 and is spouted out through an orifice 201a formed at the center of the tip 201.

A nozzle 3 is provided for covering the power feeding means 2 which is removably supported at the lower end of the torch body 1. The nozzle 3 is comprised of a cylindrical conductive member 301 fixedly engaged to the outer surface of the first power feeding member 101 and a cup-like cover member 302 of an insulation material for covering the conductive member 301. These two members 301 and 302 are fixed with each other so as to form one piece. In the case shown in FIG. 1, the nozzle supports the tip 201.

Figure 2:
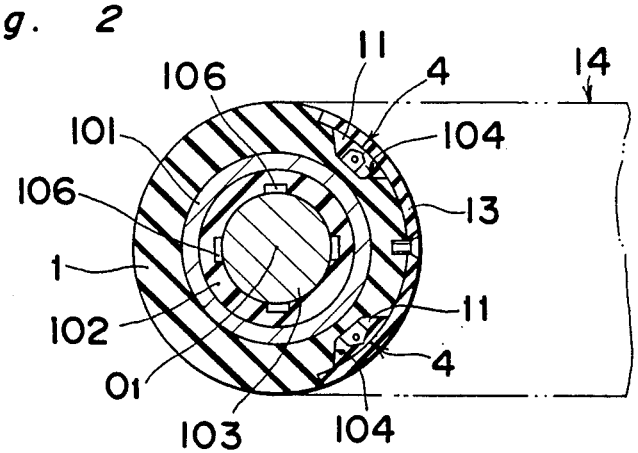
FIG. 2 is a cross-sectional view along II—II line of FIG. 1.

As shown in FIGS. 1 and 2, two channel-like grooves 104 and 104 are formed on the outer periphery of the torch body 1 of the torch 20 which extend parallel with each other in the axial direction of the torch body 1 and a pair of detection means 4 and 4 for detecting a mounted and dismounted state of the nozzle 3 are fitted into respective grooves 104 and 104.

Figure 3:
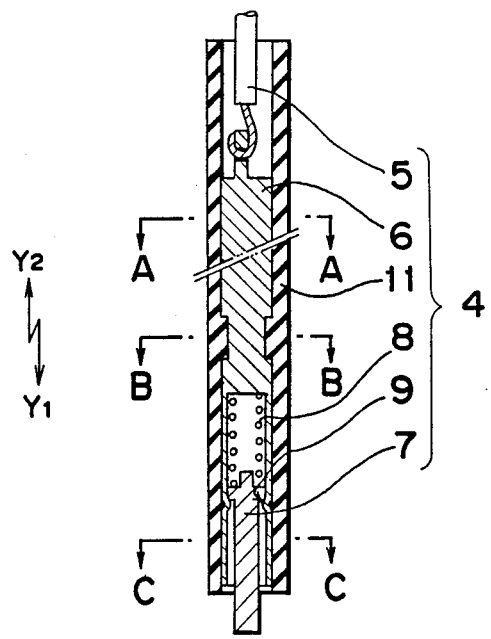
FIG. 3 is a cross-sectional view of a detection means along III—III line of FIG. 1.

As shown in FIG. 3, each detection means 4 is comprised of a conductor 5 for feeding a detection current, a terminal element 6 of a conductive material for electrically connecting a free end of the conductor 5 thereto, a detection pin 7 of a conductive material which is inserted slidably in a cylindrical bore formed in the lower half portion of the terminal element 6, a compression spring 8 inserted in the cylindrical bore for pushing the head of the detection pin 7 downwardly (in a direction indicated by an arrow $Y_1$), a stopper 9 formed by calking the cylindrical portion of the terminal element 6 which is provided for determining a protrudent amount of the detection pin 7 from the lower end of the terminal element 6 and a holder member 11 of an insulation material for holding the terminal element 6 therein to position the same in the axial direction of the torch body 1.

Figure 4A:
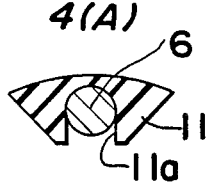
FIGS. 4(A), 4(B) and 4(C) are enlarged crosssectional views along A—A, B—B C—C lines of FIG. 3, respectively.
Figure 4B:
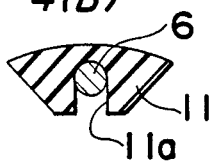
Figure 4C:
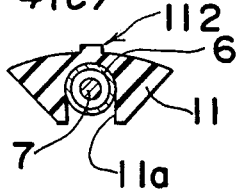
Figure 6A:
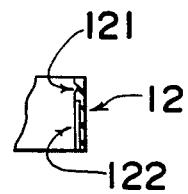
FIG. 6(A) is a vertically cross-sectioned partial view of a cylindrical cover 12 shown in FIG. 1.
Figure 6B:
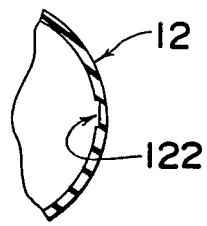
FIG. 6(B) is a horizontal cross-sectional view of FIG. 6(A)

As shown in FIGS. 4(A), 4(B) and 4(C), respectively, the holder member 11 having a fan like cross section provides a groove 11a into which the terminal element 6 can be detachably fitted from the radial direction thereof.

Figure 5:
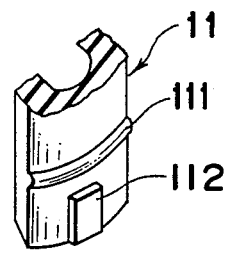
FIG. 5 is a perspective view of a lower end portion of a for holding a terminal element.

As shown in FIG. 5, an arc-like rib 111 is formed on the outer periphery of the lower end portion of the holder member 11. This rib 111 forms a ring-like rib for fixing a cylindrical cover member 12 (See FIG. 1) together with a rib 105 formed in the outer periphery of the lower end portion of the torch body 1. The cover member 12 is made of an insulation material and has a groove 121 on the inner surface thereof which engages the rib formed by the ribs 105 and 111 with a snap when inserted upwardly. It covers the junction between the torch body 1 and the nozzle 3 from the outside.

It is also possible to form a rib on the inner surface of the cover member 12 in place of the groove 121. In this case, grooves are formed on the outer surfaces of the torch body 1 and the holder member 11, respectively.

Further, it is to be noted that a positioning protrusion 112 of a rectangular shape is formed on the outer surface of the holder 11, as shown in FIG. 5. A notch 122 is formed on the inner surface of the cover ring 12 correspondingly to the positioning protrusion 112 of the holder 11. The cover member 12 is positioned in the peripheral direction of the torch body 1 when the notch 122 is engaged to the positioning protrusion 112.

The upper end of each detection means 4 is covered by an end portion of a cover member 13 which is supported interchangeably at the torch body 1, preferably at a handle portion 14 of the torch 20.

The pair of the detection means 4 and 4 form a switching means for detecting a mounted and dismounted state of the nozzle 3.

In the state that the nozzle 3 is mounted on the torch body 1 of the torch 20, both of detection pins 7 and 7 are electrically conducted by a ring portion formed at the upper end of the conductive member 301.

On the other hand, in the dismounted state of the nozzle 3, both of detection pins 7 and 7 are electrically disconnected with each other and, therefore, the detection current applied to the detection pins 7 and 7 is cut off therebetween. Due to this, a detection signal, is generated to turn off the power supply to the arc torch 20.

In operation of the electric arc torch 20, as shown in FIG. 1, a pilot arc is generated at first by applying a high voltage having a high frequency between the electrode 202 and the tip 201, via a capacitor 34, from a generator 32. The pilot arc is spouted out through the orifice 201a of the tip 201 by a flow of the plasma action gas. When the torch is approached to a work piece 16, a working arc is generated between the electrode 202 and the work piece 16. When the working arc is generated, the pilot arc disappears since a resistor 35 is connected on the way of a current feeding circuit for the pilot arc. Also, the generator 32 is usually switched off once the pilot arc is generated.

According to the structure of the electric arc torch mentioned above, the detection pins 7 and 7 are protected by the cover member 12 in the dismounted state of the nozzle 3 so as to prevent them from contacting or abutting to other elements.

Also, since the cover member 12 covers a gap between the torch body 1 and the nozzle 3 and the lower end of the holder member 11, they are free from foreign bodies such as dusts.

Further, since it is engaged to the rib (105 and 111) and the positioning protrusion 112 so as to be free from a rotation about the torch body 1 and a movement in the axial direction, the life thereof can be extended desirably.

If the detection means 4 is broken down, it is easily removed from the torch body 1 by dismounting the cover member 12 and the cover member 13 of the torch body. If it is impossible to repair the same, a new one is mounted to the torch body and, if it is possible, the same is again mounted after repairing it.

Figure 7:
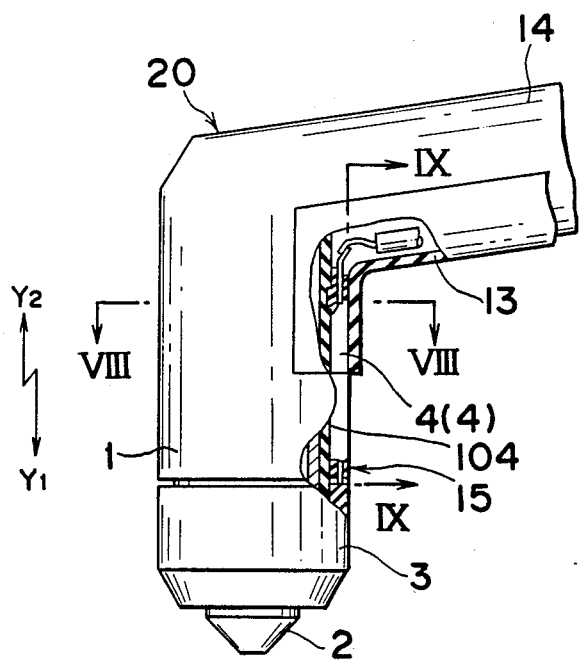
FIG. 7 is a partially sectioned front view of an electric arc according to the second preferred embodiment of the present invention.
Figure 9:
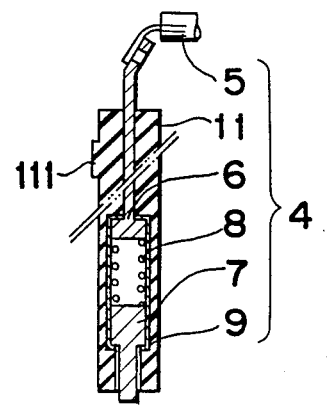
FIG. 9 is an enlarged vertical cross-sectional view of a detection means shown in FIG. 7.
Figure 8:
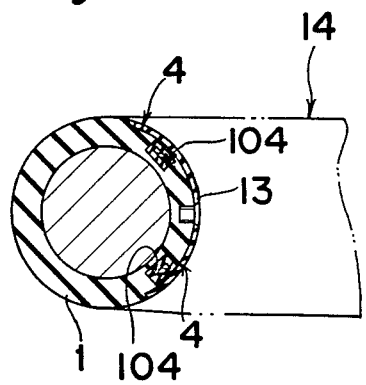
FIG. 8 is a horizontal cross-sectional view along VIII—VIII line of FIG. 7.

FIGS. 7, 8 and 9 show another preferred embodiment of the present invention and correspond to FIGS. 1, 2 and 3 showing the first preferred embodiment, respectively.

In this preferred embodiment, each detection means 4 is also fitted into each groove 104 formed on the torch body 1 in the axial direction thereof, but it is fixed only by the cover member 13 for the handle 14 of the torch 20.

Further, the detection element 4 is comprised of substantially same elements as those of the first preferred embodiment, namely a conductor 5, a terminal element 6, a detection pin 7, a compression spring 8, a cylindrical member 9 of a metal forming a stopper for the detection pin 7 and a holder 11 of an insulation material.

However, it is to be noted that the conductor 5, the terminal element 6 and the cylindrical member 9 are insert-molded in the holder 11 upon forming the same. The cylindrical member 9 containing the terminal element 6, the compression spring 8 and the detection pin 7 therein is calked at both ends thereof to form respective stoppers to the terminal element 6 and the detection pin 7.

As shown in FIG. 9 clearly, on the inner side of the holder 11, a positioning protrusion 111 is formed so as to fit into a concave notch formed on the bottom of the groove 104 and, accordingly, the holder 11 is positioned in the axial direction of the torch body 1 by engaging the positioning protrusion 111 to the concave notch.

In this preferred embodiment, the detection means 4 can be dismounted easily by removing the cover 13 for the handle of the torch in order to repair it or to interchange it with a new one. It is desirable to form the cover 13 so as to coincide with the outer surface of the handle 14 of the torch 20. Also, it is desirable to mold the cover 13 and the holder 11 so as to form one piece. In this case, the detection means can be dismounted simultaneously together with the cover 13.

It is also possible to make the detection means of the first preferred embodiment and that of the second preferred embodiment compatible with each other.

Further, it is also possible to omit the cylindrical member 9 as a stopper. In this case, the detection pin 7 is slidably guided in a hole formed in the holder 11. The stopper means for the detection pin 7 can be formed using various means known to those skilled in the art.

Figure 10:
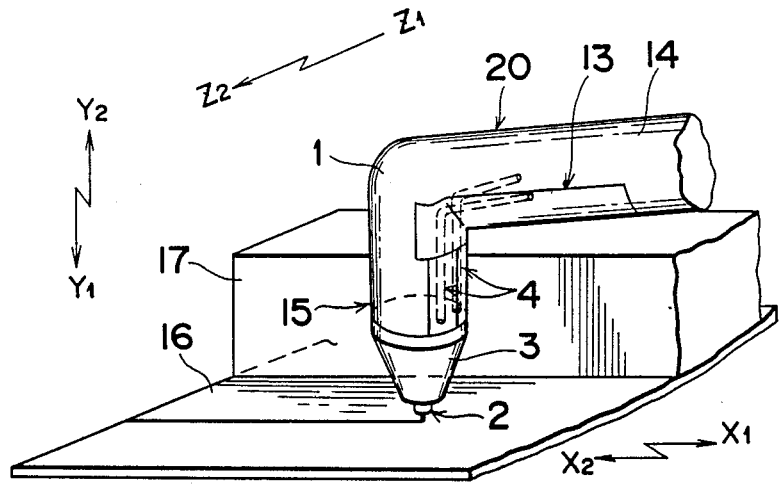
FIG. 10 is a perspective view for showing a state of use of the electric arc torch according to the present invention.
Figure 11:
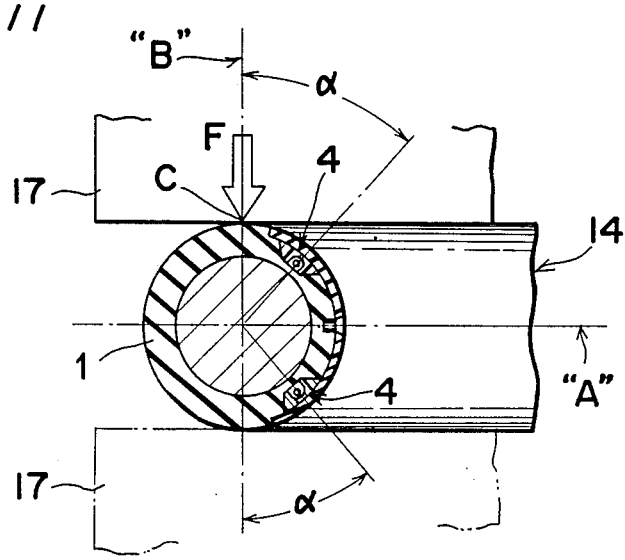
FIG. 11 is a plan view of FIG. 10 wherein the electric arc torch is cross-sectioned horizontally.

FIGS. 10 and 11 show a state of use of the torch according to the present invention.

A pair of detection means 4 and 4 is arranged at positions with respect to a plane A including axes of the handle portion 14 and the end portion 15 of the torch 20 and each of angles of lines connecting respective centers of detection means 4 and 4 and the axis of the end portion 15 is set so as to have a value $\alpha$ ($180° > \alpha > 0$) with respect to a plane B perpendicular to the plane A.

As shown in FIG. 10, the torch 20 is moved along a guide member 17. In this case, a contact point C of the torch to the guide member 17 is different from the position of each detection means 4 and, therefore, as shown in FIG. 11, it becomes free from a reactive force F applied at the contact point C even if it collides with the guide member 17 carelessly.

Further, the symmetric arrangement of these detection means 4 and 4 is advantageous for both of right handed and left handed operators. In the case of a right handed operator, the guide member 17 is set on the left hand side when seen in the direction of operation of the torch, as indicated by a solid line in FIG. 11. In the case of a left handed operator, it is set on the right hand side, as indicated by a broken line.

Generally speaking, an operator is apt to operate the torch in such a manner that his own fingers holding the handle portion 14 are kept free from dangers. Accordingly, the arrangement of the pair of detection means 4 and 4 as shown in FIG. 10 is advantageous for effective protection thereof.

Though the distance between the pair of detection means 4 and 4 is not determined uniquely, it is to be determined at a suitable value taking into consideration of a mechanical strength of the insulation material forming the torch body.

Figure 12:
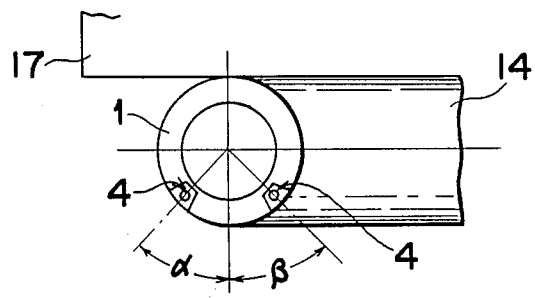
FIGS. 12, 13, 14 and 15 are plan views similar to FIG. 11 which show other preferred embodiments of the present invention, respectively.
Figure 13:
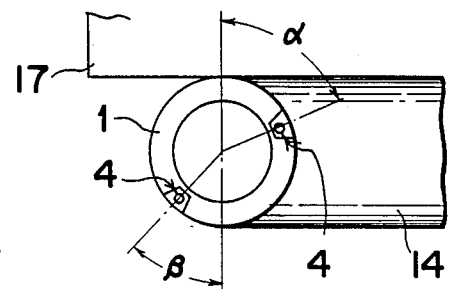

FIGS. 12 and 13 show other preferred embodiments regarding the arrangement of the detection means 4 and 4 each of which corresponds to FIG. 11.

The arrangement shown in FIG. 12 is advantageous for a right handed operator since no reactive force by the guide member 17 is exerted to respective detection means 4 and 4.

The arrangement shown in FIG. 13 is advantageous for assembling respective detection means 4 and 4 since the distance therebetween increases.

Figure 14:
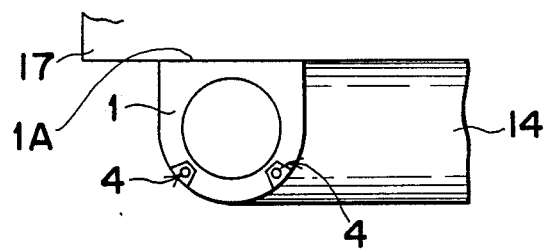
Figure 15:
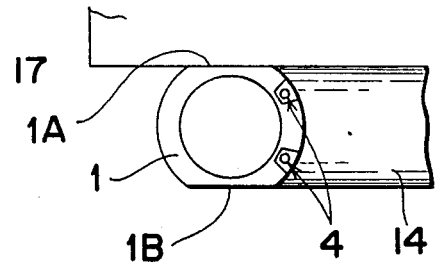

FIGS. 14 and 15 show further preferred embodiments of the present invention which are advantageous for guiding the torch.

In FIG. 14, the torch body 1 of the end portion of the torch 20 has a plane 1A parallel to a guide plane of the guide member 17. In this case, the pair of detection means 4 and 4 are arranged on the side contrary to the plane 1A.

In FIG. 15, the torch body 1 is formed to have a pair of planes 1A and 1B parallel with each other and, accordingly, the torch 20 can be guided irrespective to the side on which the guide means 17 is arranged.

A voltage of a high frequency is applied to the electric arc torch in the case of the plasma arc or the TIG arc welding or cutting. If the thickness of the insulation material forming the torch body 1 for mounting the detection means 4 and 4 is too thin, a high frequency leakage may be caused through a path defined by the power feeding means 2 of the torch 20, the detection means 4 and the guide member 17 made of iron. Though the leakage is dependent on the largeness of the power applied to the torch, electrical properties of the insulation material for the torch body 1 and the material of the guide member 17, generally speaking, it is critical to the thickness of several mm of the insulation material.

Since the detection means 4 is set at the position spaced from the plane B by the angle α, the insulation distance of the detection means 4 to the guide member 17 increases by a few mm thereby. The minimum distance necessary for maintaining the insulated state between the pair of detection means 4 and 4 is about 2 mm. In this context, it is desirable to arrange the detection means 4 at a position different from the plane B. However, the positions of the pair of the detection means can be set at positions on the plane B.

As is apparent from the above, respective detection means can be dismounted from the torch body of the torch easily in order to repair the same when the detection function for the nozzle is lost. Of course, it is interchanged with a new one if it is impossible to repair.

If the detection means is arranged at a position different from that on the plane B perpendicular to the plane A including axes of the handle portion and the end portion of the torch, it can be protected from possible large reactive forces which may be exerted from the guide member when the torch collides with the guide member carelessly. This enable the life of the detection means to increase effectively.

Figure 16:
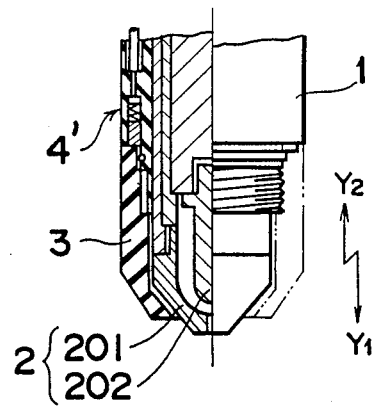
FIGS. 16(A) and 16(B) are partially sectioned front views of conventional electric arc torches which are corresponding to FIG. 1.
FIG. 16(C) is an enlarged vertical cross-sectional view of a conventional detection means 4' shown in FIGS. 16(A) and 16(B), respectively.
Figure 16:
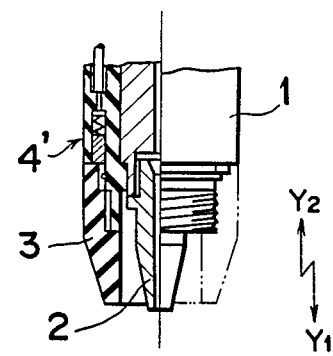
Figure 16:
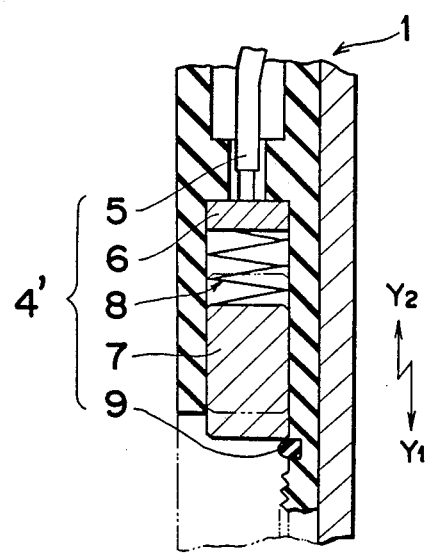

Further, as is apparent from comparison of FIG. 1 or FIG. 7 of the present invention with FIG. 16(A) or 16(B), which show prior art torches, it becomes possible to make the torch body thinner and, therefore, the torch according to the present invention can be made more compact. This contributes to easy observation of the working position and, thereby, the efficiency in working is enhanced.

It is understood that various other modifications will be apparent and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. Electric arc torch having detection means for an electric torch nozzle, said electric arc torch having a handle portion and an end portion, said handle portion axis and said end portion axis crossing at a predetermined angle, said end portion having a power feeding member and a nozzle covering the power feeding member, said power feeding member and said nozzle being arranged coaxially on said end portion of the torch, said nozzle being provided with a pair of detection means for detecting a mounted and dismounted state of said nozzle, said detection means having a detection pin being slidable in parallel with the axis of said power feeding member, said detection means further having a compression spring for biasing said detection pin, said detection means comprising:
   a pair of holders for holding respective detection means formed separately from said end portion of the torch;
   two grooves for containing said two holders therein formed on the periphery of said end portion at positions not included in a plane including the axis of said end portion which is perpendicular to a plane including both axes of said handle portion and said end portion, each said groove extending in the axial direction of said end portion; and
   a cover member for covering at least upper end portions of said pair of holders fitted into said grooves to fix said pair of holders, said cover member being detachably fixed to said end portion of the torch.

2. Detection means for an electric arc torch nozzle according to claim 1, wherein said holders and said cover element are made so as to form one piece with each other.

3. Detection means for an electric arc torch nozzle according to either one of claims 1 and 2, wherein a first engaging means is formed on said end portion of the torch and said pair of holders so as to define a relative positioning of the axial direction of said end portion, and wherein a second engaging means is formed inside of said cover member which engages to said first engaging means, said pair of engaging means being provided for determining a relative phase between said cover member and at least one holder.—

* * * * *